Sept. 7, 1965 W. R. SENECHAL 3,205,030

POWER OPERATED SELECTION MECHANISM

Filed March 30, 1962 6 Sheets-Sheet 1

INVENTOR.
WALLACE R. SENECHAL

BY Morris I. Pollack

ATTORNEY

Sept. 7, 1965 W. R. SENECHAL 3,205,030

POWER OPERATED SELECTION MECHANISM

Filed March 30, 1962 6 Sheets-Sheet 2

INVENTOR.
WALLACE R. SENECHAL

BY

Morris I. Pollack

ATTORNEY

Sept. 7, 1965 W. R. SENECHAL 3,205,030

POWER OPERATED SELECTION MECHANISM

Filed March 30, 1962 6 Sheets-Sheet 3

INVENTOR.
WALLACE R. SENECHAL
BY
Morris I. Pollack
ATTORNEY

POWER OPERATED SELECTION MECHANISM

Filed March 30, 1962

6 Sheets-Sheet 4

INVENTOR.
WALLACE R. SENECHAL

BY

Morris L. Pollack

ATTORNEY

Sept. 7, 1965 W. R. SENECHAL 3,205,030

POWER OPERATED SELECTION MECHANISM

Filed March 30, 1962 6 Sheets-Sheet 5

INVENTOR.
WALLACE R. SENECHAL

BY [signature]

ATTORNEY

POWER OPERATED SELECTION MECHANISM

INVENTOR.
WALLACE R. SENECHAL

BY
Morris L. Pollack
ATTORNEY

United States Patent Office 3,205,030

Patented Sept. 7, 1965

3,205,030

POWER OPERATED SELECTION MECHANISM

Wallace R. Senechal, North Tonawanda, N.Y., assignor to Sperry Rand Corporation, New York, N.Y., a corporation of Delaware Filed Mar. 30, 1962, Ser. No. 183,812
14 Claims. (Cl. 312—193)

This invention relates to remote controlled selection mechanism and more particularly to a power operated remote controlled selection mechanism for obtaining access to one or more of a plurality of closely arranged elements.

The present invention finds ready application to information retrieval equipment wherein visual access to elements bearing recorded information is desired and such elements are arranged in a compact grouping rendering visual access impractical without separation of the elements.

Records which under the law must be made available to the general public for obtaining information therefrom are permanent in nature and very often duplicates readily available for public use do not exist. In addition, it is often required that such public records be maintained current or updated. In view of the foregoing, equipment must be provided which easily accommodates itself to ready visual access by the public but yet prevents the latter from unauthorized handling of the records. In some cases it has been found feasible to record the information on cards mounted in a close grouping on frames which are pivotally mounted about an axes disposed in planes substantially normal to the line of sight of a user. The frames are accommodated within an enclosure or cabinet locked to prevent unauthorized access thereto but have a transparent wall or window permitting the user to view the record cards. Since the user must be able to select the proper frame bearing the card with the desired information the equipment provides means to manipulate the frames for such purpose. The foregoing means may take the form of either an opening permitting entry of the users hand but not permitting extraction therethrough of a frame, or a mechanical arm with a handle available outside the unit for user manipulation and a finger movable inside the unit for frame manipulation. In the hand-manipulated type of public records information equipment access is still available to some of the information cards and unauthorized removal possible. In addition, the weight of the frames prevents hand manipulation of more than a few frames at a time requiring a substantial expenditure of the user's energy and increasing the time spent by the user in order to obtain the desired information. In the mechanical arm type of public records equipment unauthorized removal of the information bearing cards is impossible, however, here again the weight of the frames greatly reduces the number of frames which may be manipulated with one operation of the mechanical arm thereby resulting in the same disadvantages as outlined above for the hand-manipulated type.

It is an object of this invention to provide a novel remote controlled selection mechanism.

Another object is to provide a novel power operated remote controlled selection mechanism which minimizes the energy and time expended by the user in operating the mechanism.

Another object is to provide a novel power operated remote controlled selection mechanism for positioning linearly arranged elements to expose a selected surface of one of said elements or selected surfaces of two adjacent elements for visual observation.

Still another object is to provide a power operated remote controlled selection mechanism for use with a limited access public records information unit for positioning information bearing frames disposed in the unit to allow the public visual access to the information.

A still further object is to provide a novel power operated remote controlled selection mechanism for use with a limited access public records information unit containing serially arranged information bearing frames normally in an open position, including cam means cyclically operated to close the frames and then reopen the frames to expose for view the information on selected ones of said frames.

The present invention contemplates a series of information bearing frames pivotally disposed in an enclosure behind a removable transparent portion of the enclosure which may be locked to prevent unauthorized removal thereof.

A selection control means is accessible to a user outside the enclosure and cooperates with indicia bearing means which corresponds to or identifies the information on the frames within the enclosure. Proper manipulation of the selection control means in association with the indicia bearing means effects the operation of mechanism which positions the information bearing frames to permit visual access to or retrieval of information on the selected frame or frames.

Other objects and advantages of the invention in its details of construction and arrangement of parts will be apparent from a consideration of the following specification and accompanying drawings wherein.

Figure 1:
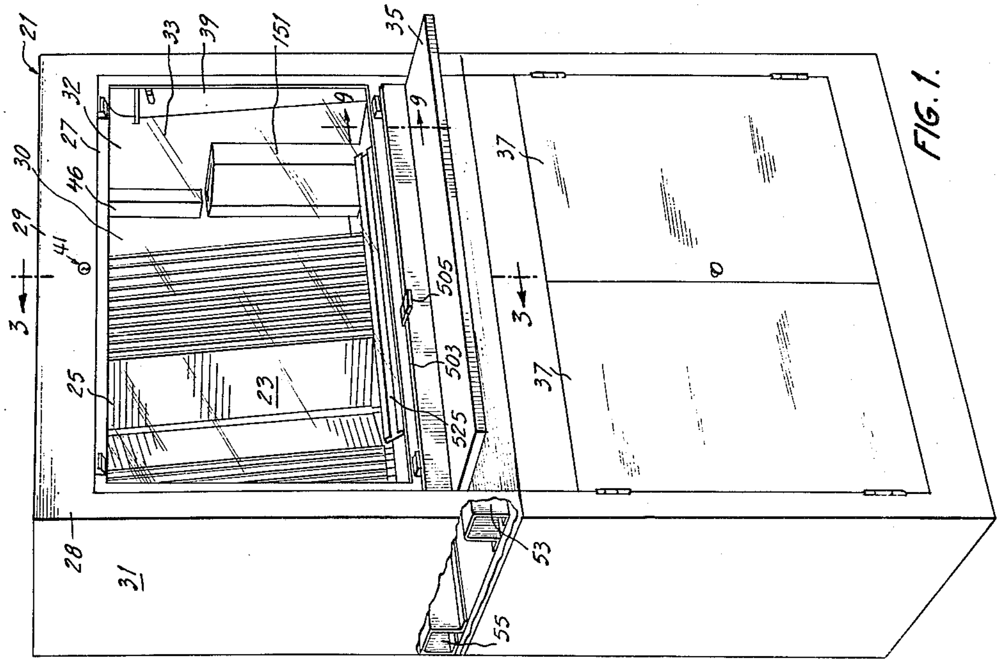
FIG. 1 is a perspective view of a public records information unit, cut away in part, which embodies the present invention.
Figures 6, 7:
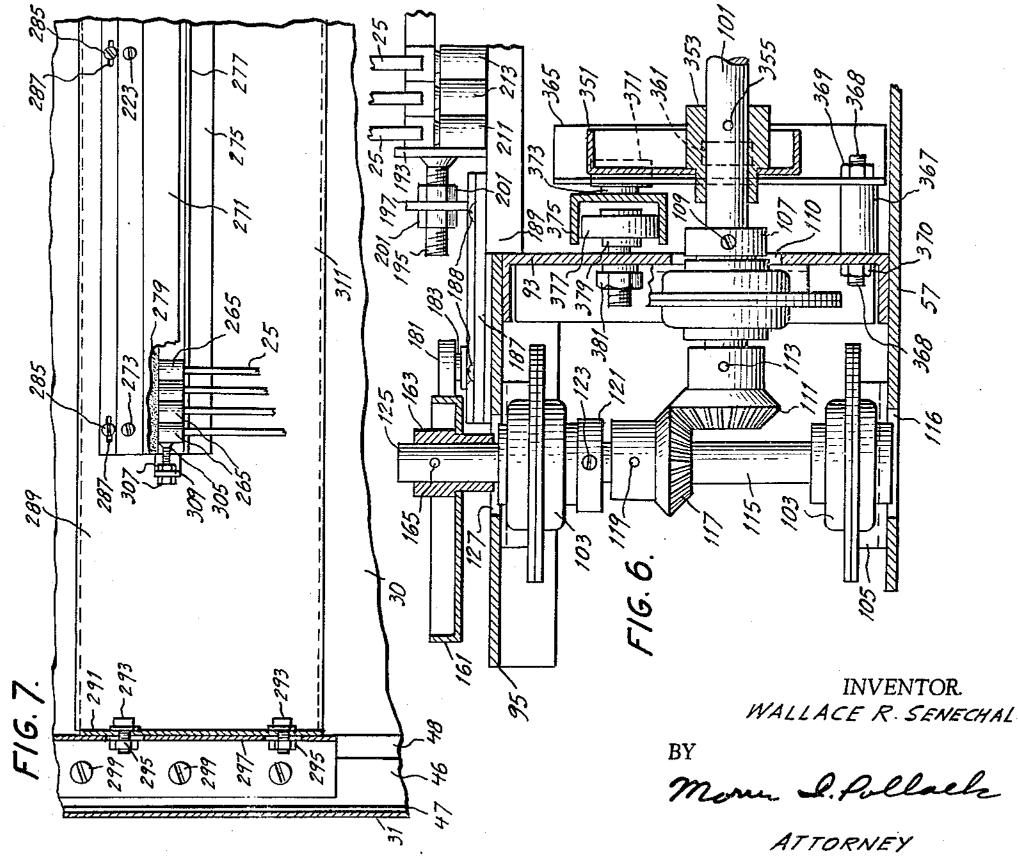
Figure 2:
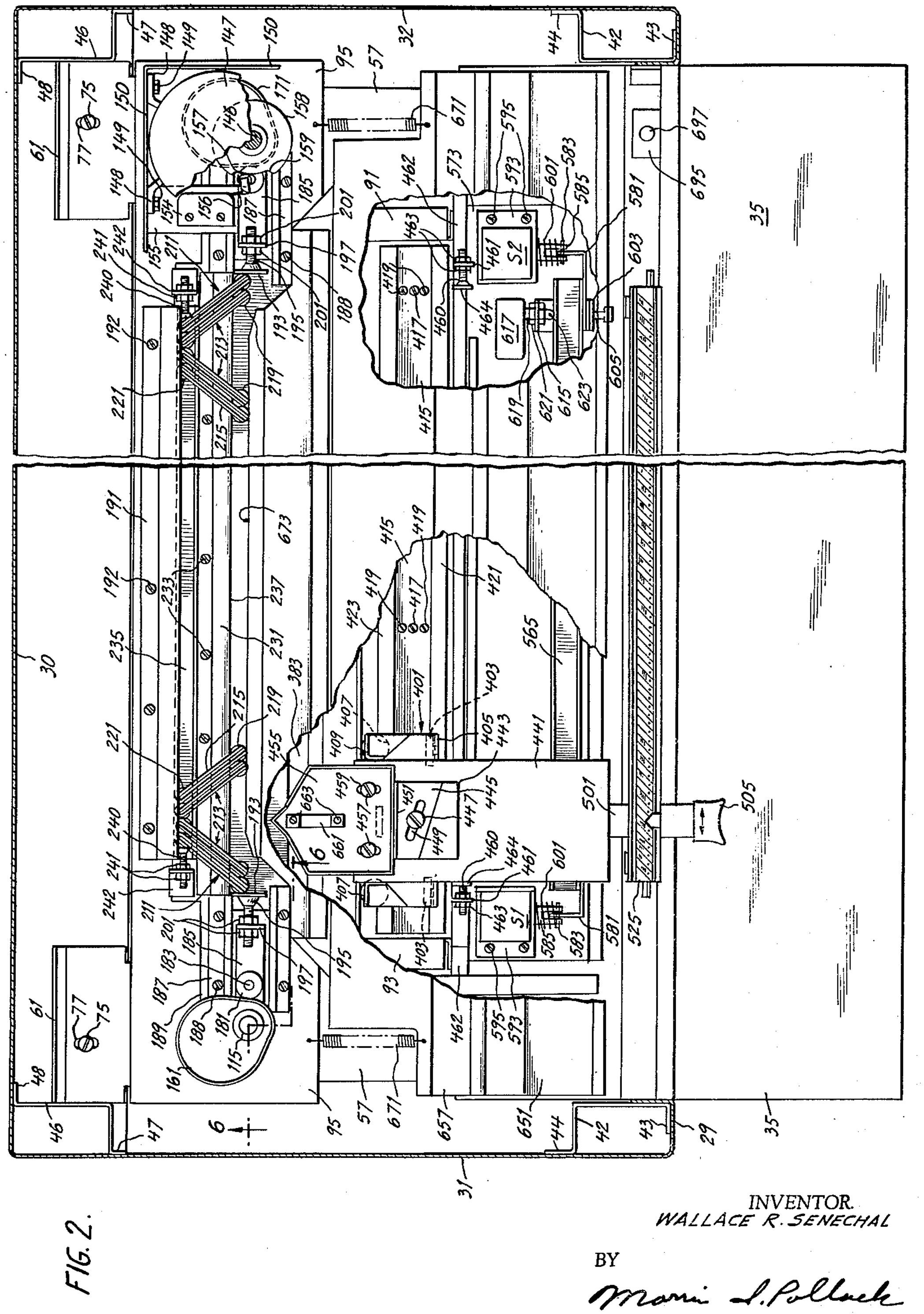
FIG. 2 is a sectional plan view taken along the line 2—2 of FIG. 3 and in which view the covers are cut away in part to show the elements thereunder.
Figure 3:
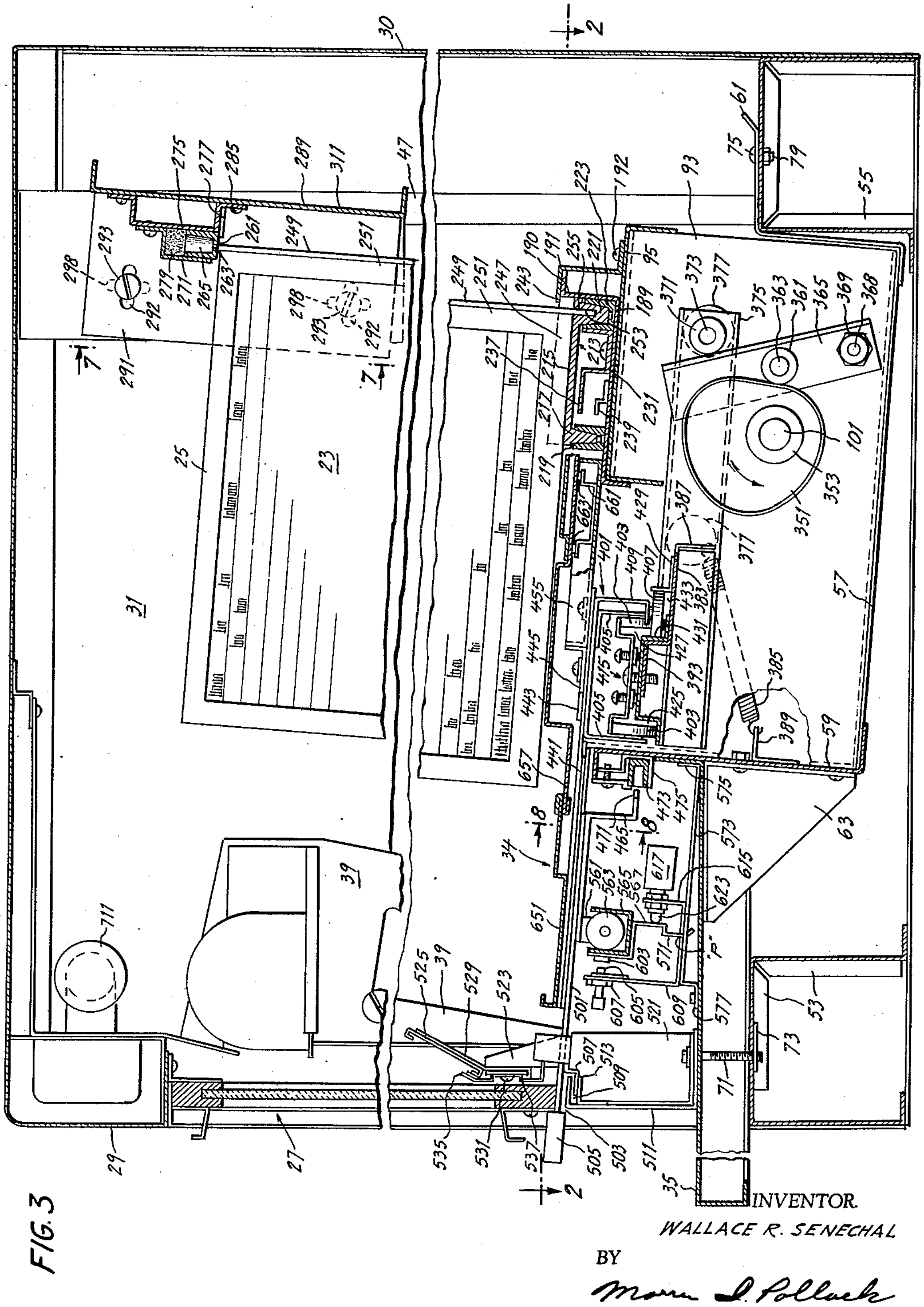
FIG. 3 is an approximate vertical sectional view taken along the line 3—3 of FIG. 1.
Figure 4:
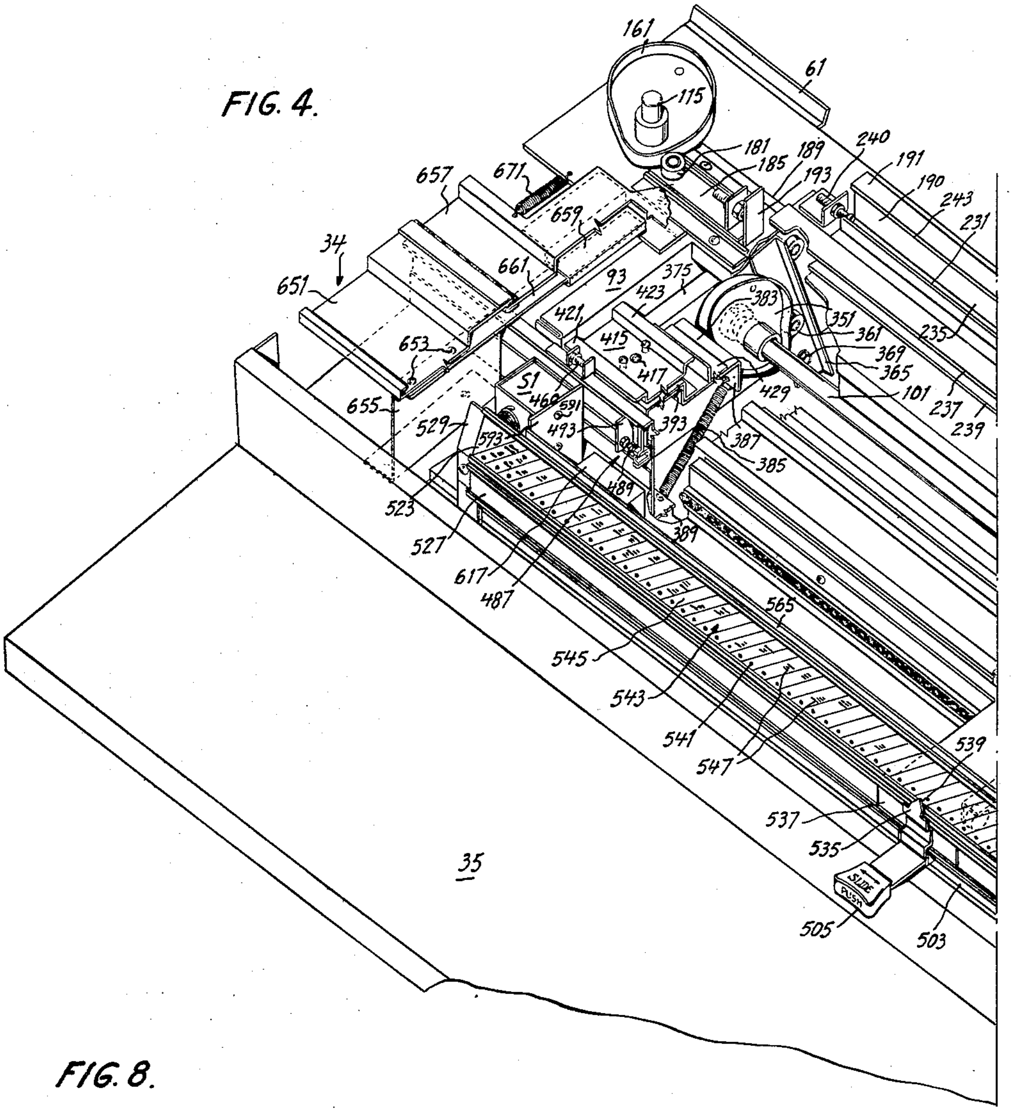
Figure 8:
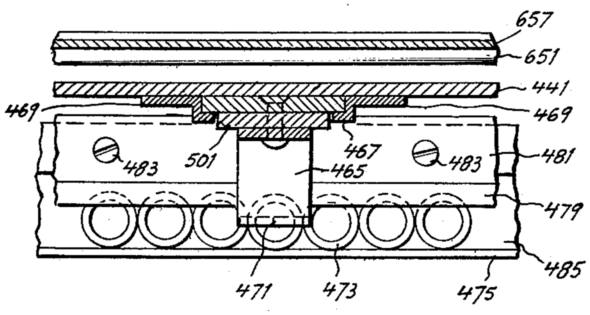
Figure 5:
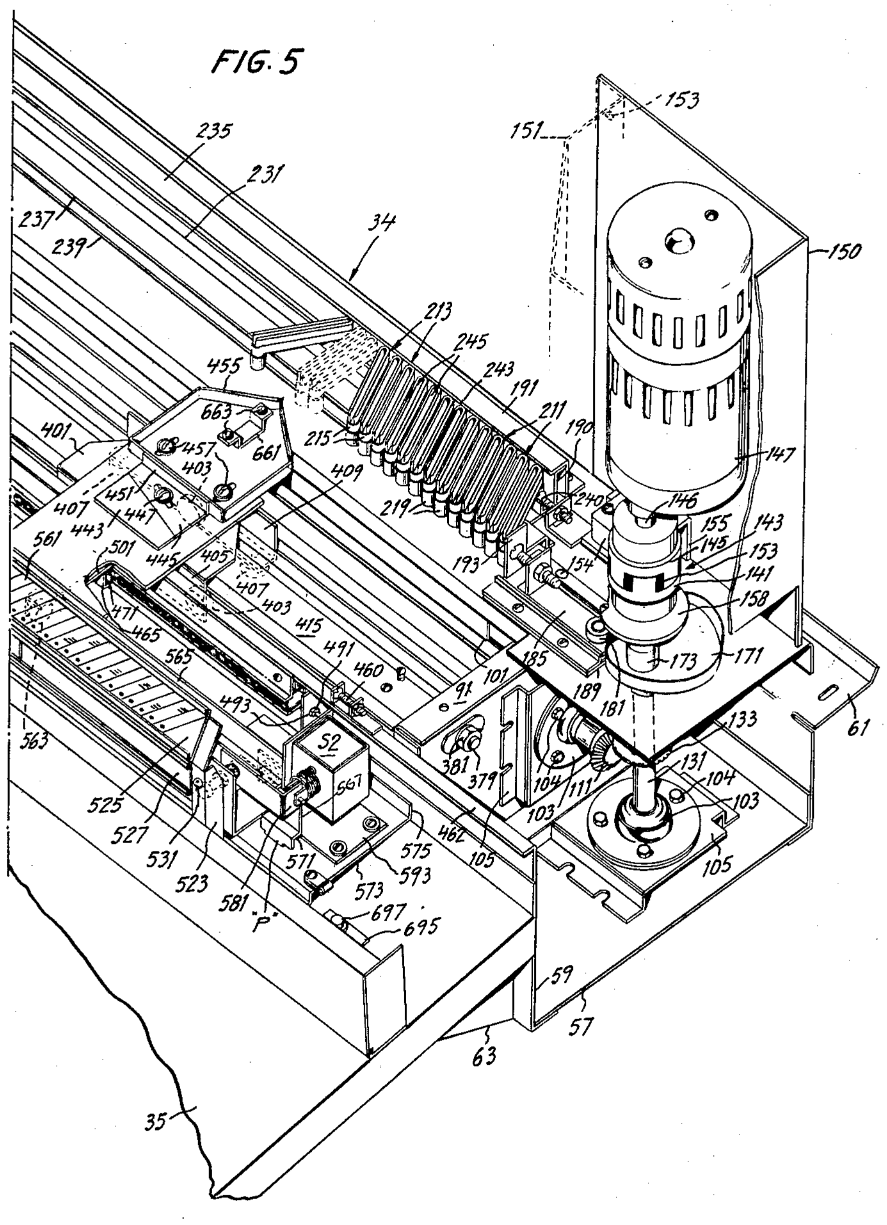
Figure 10:
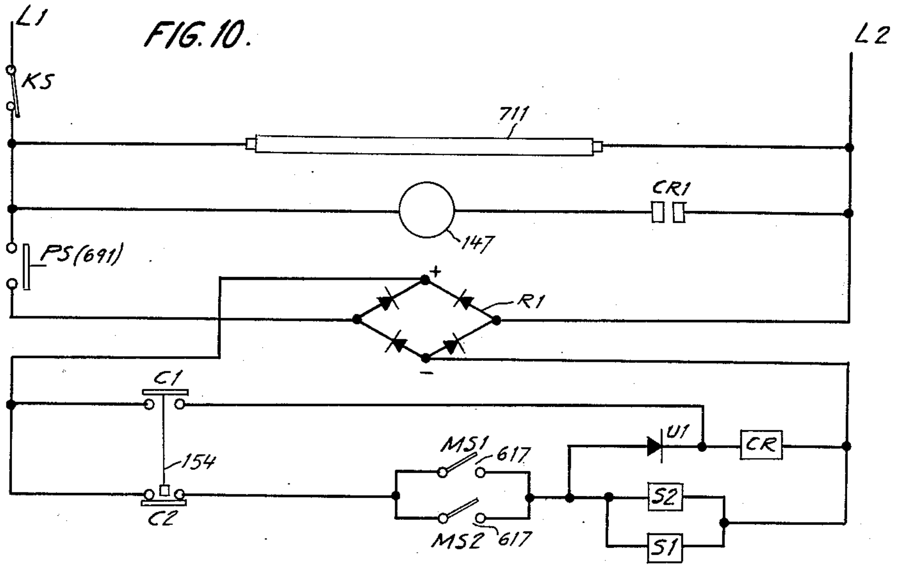
Figures 9, 11:
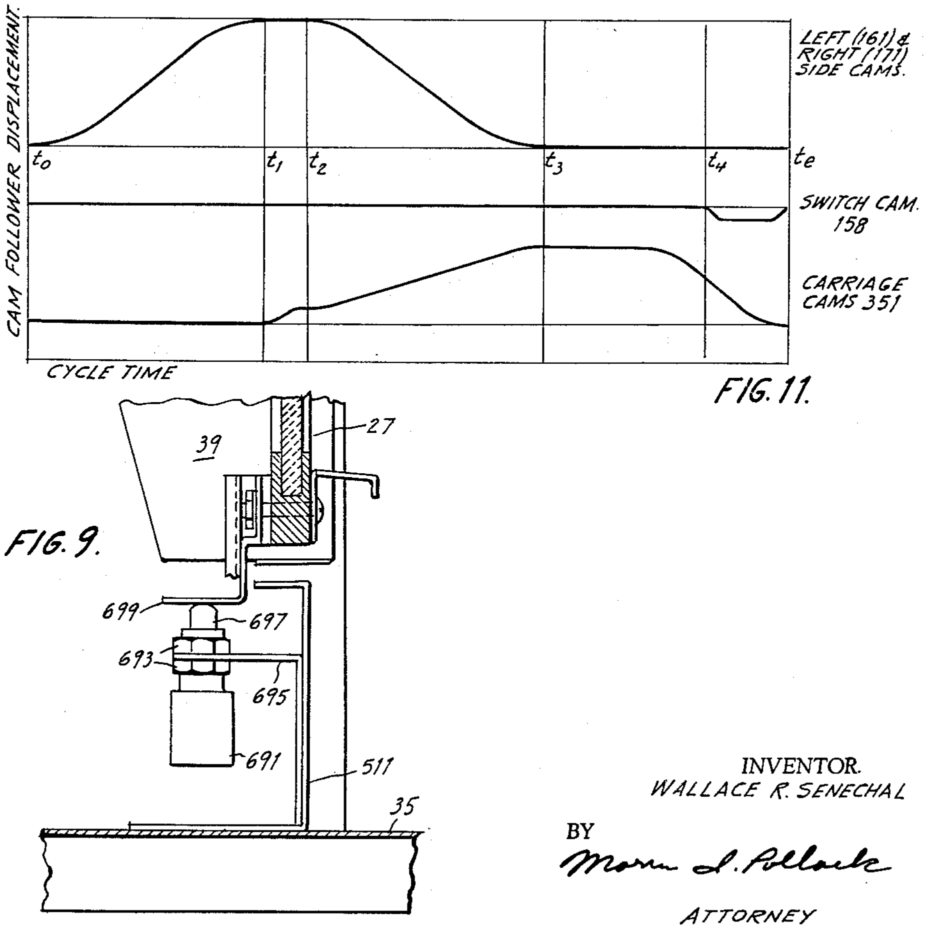

FIGS. 4 and 5 when placed side by side provide an isometric view of the assembled selection mechanism with the frames and a major portion of the covers removed;

FIG. 6 is a fragmentary view, in section, taken along the line 6—6 of FIG. 2;

FIG. 7 is a fragmentary view, in section, taken along the line 7—7 of FIG. 3;

FIG. 8 is a fragmentary view, in section, taken along the line 8—8 of FIG. 3;

FIG. 9 is a fragmentary view, in section, taken along the line 9—9 of FIG. 1;

FIG. 10 shows a circuit diagram for effecting operation of the selection mechanism; and FIG. 11 is a timing chart to more clearly illustrate the principles of operation of the subject invention.

Referring to the drawings for a more detailed description of the present invention, an embodiment thereof is shown incorporated in a limited access public records unit, generally designated by the numeral 21 (FIG. 1), in which visual information 23 is displayed on a plurality of serially arranged frames 25 pivotally arranged behind a transparent closure or window 27 of a cabinet or enclosure 28. It should be understood however, that the hereinafter described application of the invention to a limited access public records unit is for purposes of illustration only inasmuch as the subject invention finds ready application in any device having a plurality of serially arranged elements and in which a surface of one of said serially arranged elements or the surfaces of adjacent ones of said serially arranged elements must be positioned for visual observation.

Enclosure 28 comprising front wall 29, rear wall 30, left wall 31, and right wall 32 is provided with an aperture 33 in the front wall 29 which affords access to the frames 25 and the selection mechanism 34 (FIGS. 4 and 5) mounted in the upper portion of the inside of the enclosure 28. A shelf 35 upon which the user may work protrudes from the front of the unit 21. Doors 37 are provided on the lower portion of the unit 21 for access to storage space or the like.

Manual access to the inside of the upper portion of the enclosure 28 is restricted to authorized personnel by mounting transparent closure 27 in the aperture 33. Brackets 39 (FIGS. 1, 3 and 9) carried by side walls 31, 32 of enclosure 28 allow transparent closure 27 to be either moved out of aperture 33 or secured within aperture 33 by means of a lock 41. One type of transparent closure which may be used in this equipment and the mounting therefor is disclosed in my copending U.S. Patent Application Serial No. 151,028, filed on November 8, 1961 and which has now matured into U.S. Patent No. 3,085,840 granted on April 16, 1963.

Front vertical braces 42 (FIG. 2) are secured in the front inner corners of enclosure 28 as by welding front lips 43 of front vertical braces 42 to front wall 29 of enclosure 28 and by securing side lips 44 of front vertical braces 42 to side walls 31 and 32 of enclosure 28. Rear vertical braces 46 (FIG. 2) are secured in the rear inner corners of enclosure 28 by side lips 47 thereof which are secured to side walls 31 and 32 of enclosure 28 and by rear lips 48 thereof which are secured to rear wall 30 of enclosure 28. Front and rear horizontal braces 53 and 55 respectively (FIGS. 1 and 3) are also provided within enclosure 28 to support the walls thereof.

A bottom support plate 57 (FIGS. 3, 5 and 6) is suspended between front horizontal brace 53 and rear horizontal brace 55 by a front support plate 59 (FIGS. 3 and 5) and two rear support plates 61 (FIGS. 2, 3 and 5). Gussets 63 (FIGS. 3 and 5) positioned near the right and left extremeities of front support plate 59 are used to interconnect front support plate 59 to the shelf 35. Shelf 35, gussets 63, front support plate 59, bottom support plate 57 and rear support plates 61 may be secured together by any suitable means such as welding, riveting, bolting and the like.

A plurality of bolts 71 (FIG. 3) are threaded into a plurality of tapped plates 73 spaced along front horizontal brace 53 to secure shelf 35 and attached support structure to front horizontal brace 53. Bolts 75 (FIGS. 2 and 3) are passed through elongated slots 77 in rear support plates 61 and threaded into nuts 79 (FIG. 3) to secure rear support plates 61 to rear horizontal brace 55. Because shelf 35, gussets 63, front support plate 59, bottom support plate 57, and rear support plate 61 comprise a plurality of interconnected shaped members, some of which have sizable dimensions, accumulated tolerances will vary the overall depth of the interconnected parts. Accordingly, elongated slots 77 are provided in rear support plates 61 to allow for relative displacement between rear support plates 61 (when part of the interconnected parts) and rear horizontal brace 55.

It should be noted that bottom support plate 57 is suspended between front support plate 59 and rear support plates 61 with a rearward tilt of a few degrees to the horizontal (FIG. 3). This rearward tilt carries through for the structure of selection mechanism 34 mounted above the support plate 57 (FIG. 3) and in the ultimate is used to provide a bias towards open position for frames 25. Although the rearward tilt may be at any small angle, an angle of four degrees has been found to work well.

A right end support 91 (FIGS. 2 and 5) and a left end support 93 (FIGS. 2, 4 and 6) are secured on bottom support plate 57 between rear support plate 61 and front support plate 59. A top support plate 95 (FIGS. 2, 3 and 6) is secured in place over the right end support 91 and left end support 93.

A main drive shaft 101 (FIGS. 3 and 6) is journaled in self-aligning bearings 103 secured by bolts 104 to brackets 105 welded to right end support 91 and left end support 93, respectively. The support and power take off structure for main shaft 101 is identical for both the right and left ends and therefore only the left end is shown in detail (FIG. 6). Collars 107 are secured on main shaft 101 adjacent the inner side of the self-aligning bearings 103. Securing means 109 in the form of a set screw are used to prevent rotational and longitudinal movement of collar 107 with respect to main shaft 101 except during assembly or adjustment thereof. Apertures 110 are provided in left end support 93 (FIG. 6) and right end support 91 to accommodate main shaft 101 and collar 107. A bevel gear 111 (FIGS. 5 and 6) is secured on each end of main shaft 101 by a pin 113 (FIG. 6).

A vertically arranged left stub shaft 115 (FIG. 6) has its lower end rotatably mounted in a self-aligning bearing 103 secured by bolts such as bolts 104 (FIG. 5) to a bracket 105 welded to lower support plate 57 near the left end thereof. An aperture 116 is provided in lower support plate 57 to accommodate part of bearing 103. An upper portion of left stub shaft 115 is rotatably mounted in a self-aligning bearing 103 secured by bolts such as bolts 104 (FIG. 5) to a bracket 105 welded to upper support plate 95 near the left end thereof. A bevel gear 117 (FIG. 6) is secured to stub shaft 115 by a pin 119 and is in mesh with bevel gear 111 on the left end of main shaft 101. A collar 121 is secured on stub shaft 115 between bearing 103 and bevel gear 117 by a set screw 123. An upper end 125 (FIG. 6) of stub shaft 115 extends through an aperture 127 in upper support plate 95.

A vertically arranged right stub shaft 131 (FIG. 5) has its lower end rotatably mounted in a self-aligning bearing 103 secured by bolts 104 to bracket 105 welded to lower support plate 57 near the right end thereof. An upper portion of right stub shaft 131 (not shown) is rotatably mounted in a manner similar to the upper portion of left stub shaft 115 in a self-aligning bearing 103 secured by bolts such as 104 to a bracket 105 welded to upper support plate 95 near the right end thereof. A bevel gear 133 partly shown in FIG. 5 is pinned on right stub shaft 131 and is in mesh with bevel gear 111 on the right end of main shaft 101. A collar (not shown) similar to collar 121 (FIG. 6) is secured to right stub shaft 131 between bevel gear 133 and the self-aligning bearing 103 which is secured to upper support plate 95. The stub shaft 131 has an upper end (not shown) extending through an aperture in upper support plate 95.

A lower jaw 141 (FIG. 5) of a coupling 143 is connected to the upper end of stub shaft 131. An upper jaw 145 of coupling 143 is secured to an end of a drive shaft 146 of an electric motor 147 carried by a motor support 148 (FIG. 2). Bolts 149 are used to secure motor support 148 to an L-shaped motor mounting plate 150 which is welded to upper support plate 95. A motor cover 151 (FIGS. 1 and 5) is attached by bolts 153 to motor mounting plate 150.

Electric motor 147 is of well known construction with its drive shaft 146 eccentric to its armature shaft (not shown). Internal gearing (not shown) is utilized to interconnect the motor armature shaft with the drive shaft 146 to provide a low speed drive. While many low speeds would be acceptable, a speed of 12 r.p.m. has been found to work well. Motor 147 is further provided with an internal brake (not shown) of well known construction which brakes the armature shaft immediately upon opening of the electrical circuit to motor 147. A resilient interconnecting member 153 is positioned between lower jaw 141 and upper jaw 145 of coupling 143 to take up shock and allow for slight misalignments between stub shaft 131 and drive shaft 146.

A switch 154 (FIGS. 2 and 5) used to control operation of motor 147 is mounted on a bracket 155 secured to motor mounting plate 150. Operating arm 156 for switch 154 is flexible and terminates in a roller 157 which, due to the bias thereon, follows a switch cam 158 having a recess 159 thereon.

A left side cam 161 (FIGS. 4 and 6) carried by a collar 163 is secured by a pin 165 to upper end 125 of left stub shaft 115. A right side cam 171 (FIG. 5) carried by a collar 173 is pinned near the upper end of right stub shaft 131.

Rollers 181 (FIGS. 4, 5 and 6) rotatably mounted on studs 183 secured to slide plates 185 function as cam followers for side cams 161 and 171 respectively. Guide members 187 (FIGS. 2 and 6) are secured by screws 188 to a top plate 189 (FIG. 3) and upper support plate 95. A rear support flange 190 (FIG. 3) is welded to a back flange 191 attached by screws 192 to upper support plate 95 and thereby firmly secures the top plate 189 to upper support plate 95. A stop plate 193 (FIGS. 2, 4, 5 and 6) is welded to a threaded member 195 carried by a bracket 197 secured to slide plate 185. Two nuts 201 (FIG. 6) threaded onto threaded member 195 and positioned one on each side of bracket 197 provide a means of adjusting the position of stop plate 193 with respect to slide plate 185.

End frame carrying assemblies 211 (FIGS. 2, 5 and 6) pivotally movable on the surface of top plate 189 are adapted to be in engagement with stop plates 193. A plurality of intermediate frame carrying assemblies 213 (FIGS. 2 and 5) are pivotally movable on the surface of top plate 189 between end frame carrying assemblies 211. The end frame carrying assemblies 211 and intermediate frame carrying assemblies 213 are identical in structure and include an arm 215 having a front leg 217 set in a pivoting roller 219 and a rear leg 221 set in a pivot roller 223.

A guide 231 (FIGS. 2 and 3) is secured to top plate 189 by screws 233 (FIGS. 2 and 3) and spaced from back flange 191 of top plate 189 so as to form a channel 235 (FIGS. 4 and 5) for pivot rollers 223. Front lip 237 of guide 231 and a flange 239 welded to top plate 189 (FIGS. 3 and 5) act as back stops for pivoting rollers 219.

End stops 240 adjustably mounted by two nuts 241 on brackets 242 are secured to top plate 189 at each end of channel 235. A lip 243 (FIG. 3) of rear support flange 190 extends over the top of arms 215 of frame assemblies 211 and 213 to keep frame assemblies 211 and 213 properly seated in channel 235.

A groove 245 (FIG. 5) is provided in the top surface of arms 215 to receive the rear portion 247 of the lower edge of frames 25 (FIGS. 3 and 6). An upstanding hinge pin 249 (FIG. 3) which extends along the entire rear edge 251 of frames 25 has a lower extension 253 which is pivotally seated in an aperture 255 formed in rear leg 221 of arm 215. An upper extension 261 (FIG. 3) of hinge pin 249 seats in an aperture 263 formed in the end of upper pivot rollers 265 (FIGS. 3 and 7). A clamping plate 271 attached by screws 273 to pivot roller support 275 and a bottom lip 277 welded to pivot roller support 275 maintain upper pivot rollers 265 in position. A resilient pad 279 (FIGS. 3 and 7) positioned above the upper, pivot rollers 265 and between the clamping plate 271 and pivot roller support 275 allows upward movement of pivot rollers 265 during insertion of frames 25 so that lower extension 251 of hinge pin 249 may be inserted in aperture 255 of arm 215. Screws 285 passing through elongated slots 287 secure pivot roller support 275 to a cross tie 289 running across the upper rear portion of enclosure 28. Elongated slots 287 allow for shifting of pivot roller support 275 from side to side in order to properly position frames 25. Sides 291 of cross tie 289 are attached by bolts 293 (FIG. 7) and nuts 295 to side plates 297 and which side plates 297 are secured to rear vertical braces 46 by screws 299.

Elongated slots 292 in sides 291 of cross tie 289 and elongated slots 298 in side plates 297 provides a means of adjustment for cross tie 289 and thereby upper pivot rollers 265. An adjustment screw 305 (FIG. 7) attached by two nuts 307 to a bracket 309 secured to cross tie 289 is positioned at each end of pivot roller support 275 to provide a take up adjustment to maintain upper pivot rollers 265 in adjacent contact positions. Cross tie 289 is provided with a surface 311 of extended length along which the pivot roller support 275 and attached structure may be positioned to accommodate frames 25 of different lengths.

End frame carrying assemblies 211 and intermediate frame carrying assemblies 215 may both have mounted therein identical frame 25.

It is not intended to move the end frame assemblies 211 into a position to expose the surface of the frame 25 carried thereby which normally faces the side walls 31, 32 respectively of enclosure 28. Therefore no information should be displayed on these surfaces. If desired, dummy frame members of narrow depth and not adapted to carry information may be mounted in the end frame assemblies 211.

A carriage cam 351 (FIGS. 3, 4 and 6) is carried by a collar 353 which is secured to main shaft 101, near the left end thereof, by a pin 355. A carriage cam follower roller 361 is rotatably mounted on a stud 363 which is secured to an arm 365 pivotally mounted on a stud 367 (FIG. 6) having two threaded ends 368 of reduced diameter. A nut 369 is used to attach arm 365 to stud 367 and a nut 370 is used to attach stud 367 to left end support 93. A roller 371 (FIG. 3) is rotatably mounted on a stud 373 secured to a guide channel 375. Guide channel support rollers 377 (FIGS. 3, and 6) rotatably mounted on studs 379 secured to left end support 93 by nuts 381 provide a rolling support for guide channel 375. Only the carriage cam 351, arm 365, guide channel 375, guide channel support rollers 377 and their respective mounting members for the left side of the mechanism have been illustrated and described in detail. Duplicate structure is mounted on the right side of the mechanism.

A carriage support 383 (FIGS. 2, 3 and 4) spans the central portion of the unit and is welded at its left and right ends to guide channels 375 which are positioned respectively on the left and right sides of the unit. Springs 385 attached to lips 387 of carriage support 383 and brackets 389 on the front support plate 59 urge the carriage support 383 towards the front wall 29 of the enclosure 28.

A wheel guide plate 393 (FIGS. 3 and 4) is welded onto the upper surface 395 of the carriage support 383. A traveling carriage 401 is in rolling contact with wheel guide plate 393 by three vertically arranged wheels 403 (FIGS. 2 and 3) mounted for rotation on legs 405 of traveling carriage 401 and two horizontally arranged wheels 407 mounted for rotation on leg 409 of traveling carriage 401. An adjustable gib 415 is attached to wheel guide 393 by bolts 417. Adjustment screws 419 are used to position flanges 421, 423 of adjustable gib 415 with respect to wheel guide 393 to provide guide channels 425, 427 for vertical wheels 403 of the traveling carriage 401. A retainer plate 429 welded to carriage support 383 forms with the side wall 431 of wheel guide 393 a guide channel 433 for guiding horizontal wheels 407 of traveling carriage 401.

An extension plate 441 welded on top of traveling carriage 401 has a stationary cam plate 443 secured thereon. A movable cam plate 445 is attached to the extension plate 441 by a bolt 447. An elongated slot 449 in movable cam plate 445 allows for sliding movement of movable came plate 445 on stationary came plate 443 and corresponding forward movement of a front edge 451 of movable cam plate 445. The position of a center cam 455 which is bolted to extension plate 441 by bolts 457 is determined by the position of front edge 451 of movable cam plate 445. Elongated slots 459 in center cam 455 allow for forward and rearward movement thereof.

Adjustable stops 460 (FIGS. 2 and 5) are mounted in brackets 461 welded to an upper ledge 462 of front support plate 59. Two nuts 463 are provided for each adjustable stop 460, one nut being positioned on each side of bracket 461. A plate 464 secured on each adjustable stop 460 acts as an abutment for extension plate 441 and thereby controls the extremities of travel for traveling carriage 401.

A center cam locator 465 (FIGS. 3, 5 and 8) is carried for sliding movement transversely of the direction of carriage movement in a channel 467 formed by two gibs 469 secured to the underside of extension plate 441. A locator tip 471 is adapted to be seated in any one of plural locator rollers 473 carried by a bracket 475 (FIG. 3) welded to front support plate 59. A front lip 479 of a retainer plate 481, which is secured to bracket 475 by screws 483, holds locator rollers 475 in place in a channel 485 formed by retainer plate 481 and bracket 475.

Adjustable stops 487 (FIGS. 4 and 5) comprising a screw 489 adjustably held by two nuts 491 in a bracket 493 welded to front support plate 59 are positioned one at each end of the row of locator rollers 473 to prevent locator rollers 473 from falling out the end of channel 485.

Control slide 501 (FIGS. 2, 3 and 5) which protrude through a slot 503 in front wall 29 of enclosure 28 is formed as an extension of center cam locator 465 and terminates in a handle 505. A control slide guide 507 (FIG. 3) secured to the control slide 501 travels in a channel 509 formed between two guide supports 511, 513 bolted to shelf 35 with bolts 71 which secure shelf 35 in enclosure 28. End brackets 521 (FIG. 3) are welded to guide supports 511 and 513 and have upright portions 523 (FIGS. 3, 4 and 5) which close slot 503 and function as stops for control slide 501. A label holder 525 and indicator guide 527 are mounted on a support plate 529 attached to upright portions 523 of end brackets 521 by threaded members 531. Indicator 535 carried by control slide 501 has welded thereto a guide member 537 which travels in the indicator guide 527. A pointer 539 formed as part of indicator 535 is adapted to be aligned with indicator dots 541 on label 543 positioned in label holder 525. Each section 545 of label 543 has not only an indicator dot 541 therein but also markings 547 to indicate the data contained on frames 25 corresponding to each position of indicator 535.

A depending leg 561 (FIG. 3) of center cam locator 465 carries a roller 563 which is adapted to move longitudinally within a channel member 565 (FIGS. 3 and 5) mounted on a switch actuator bar 567. Pivot legs 571 (FIGS. 3 and 5) mount the switch actuator bar 567 for pivoting movement about a pivot *"p"* on a base plate 573 secured by a first flange 575 to front support plate 59 and by a second flange 577 to shelf 35. Side arms 581 (FIGS. 2 and 5) formed at each end of switch actuator bar 567 are attached by pins 583 (FIG. 2) to plungers 585 of solenoids S1, S2. Screws 591 are used to secure solenoids S1, S2 to a bracket 593 attached to base plate 573 by screws 595. Springs 601 which surround the plungers 585 of solenoids S1, S2 bear against the side arms 581 and bias the switch actuator bar 567 so that stop pads 603 carried by switch actuator bar 567 will bear against adjustable stops 605 positioned one at each end of switch actuator bar 567. Nuts 607 (FIG. 3) are provided to attach each adjustable stop 605 to a support bracket 609 welded to the base plate 573.

An upright flange 615 (FIG. 3) on each support bracket 609 mounts a microswitch 617. A mounting stud 619 provided on each microswitch 617 is threaded into the upright flange 615 and secured in place by two nuts 621. Plungers 623 (FIG. 3) of microswitches 617 are in a position to be actuated by switch actuator bar 567 when switch actuator bar 567 pivots clockwise (FIG. 3) about pivot *"p"*.

A stationary cover 651 (FIGS. 2, 3 and 4) spans the rear section of the mechanism. Bolts 653 (FIG. 4) secure stationary cover 651 to cover supports 655 attached to shelf 35 at each end of the mechanism. A movable cover 657 (FIGS. 2, 3 and 4) spans the front section of the mechanism. Cover guides 659 (FIG. 4) secured to the underside of movable cover 657 slide on extensions 661 of cover supports 655. The cover guides not only guide the movement of movable cover 657 but also support the ends thereof. Bracket 661 mounted on top of center cam 455 (FIG. 2, 3 and 5) carries two rub buttons 663 (FIGS. 3 and 5) made from a material with a low coefficient of friction such as nylon and supports the central portion of movable cover 657. Springs 671 (FIGS. 2 and 4) anchored to the upper support plate 95 and movable cover 657 bias an edge 673 of movable cover 657 against pivoting rollers 219 to urge arms 215 and frames 25 carried thereby into open position as shown in full lines in FIGS. 2 and 5.

A safety switch 691 (FIG. 9) is mounted by two nuts 693 to a bracket 695 (FIGS. 2, 5 and 9) carried by guide support 511. The plunger 697 of safety switch 691 is adapted to be actuated by an arm 699 (FIG. 9) carried by transparent closure 27.

A fluorescent light 711 is positioned inside the enclosure 28 to provide the illumination required to read the information 23 carried by frames 25.

The electrical circuit for the mechanism is shown in FIG. 10. Lines L1, L2 are connected to a suitable source of alternating current. A main switch KS is provided in line L1. Fluorescent light 711 is connected across the lines L1–L2 and in circuit with main switch KS. Electric motor 147 is also connected across the lines L1–L2 and in series with normally open contacts CR1 of a control relay CR. A full wave rectifier R1 is connected across the lines L1–L2 with the contacts PS of safety switch 691 in line L1 between the source of power and full wave rectifier R1.

The remaining circuit elements are connected across the positive and negative terminals of the full-wave rectifier R1 which full-wave rectifier R1 supplies suitable D.C. power thereto. A first circuit includes normally open contacts C1 of switch 154 and the control relay CR. The switch 154 is a make before break type switch in which contacts C1 will make before contacts C2 break. The other circuit includes the normally closed contacts C2 of switch 154 as well as the contacts MS1 and MS2 of switches 617. Solenoids S1, S2 are connected to the contacts MS1 and MS2 so that regardless of which contact is closed both solenoids will be energized. A unidirectional device U1 is connected in the line between the contacts MS1 and MS2 and the control relay CR.

In operation the mechanism is connected to a suitable source of power through lines L1, L2 (FIG. 10). With the switch KS closed the lamp 711 illuminates the inside of enclosure 28. The user grasps knob 505 (FIG. 3) and moves the control slide 501 either to the right or left to align the pointer 539 of indicator 535 with dot 541 in the space 545 on label 543 which has the marking 547 thereon defining the area of frames 25 which the user desires to examine. The traveling carriage 401 and center cam 455 are moved along with control slide 501. The control slide 501 is then pushed in partially seating the locator 471 (FIG. 5) in a locator roller 473. The sides of the locator roller 473 coact with the sides of the locator 471 to properly locate the center cam 455 in a position which allow the center cam to enter between two adjacent frames 25 when the frames are closed. The gibs 469 (FIG. 8) allow the control slide 501 to move inwardly with respect to the mechanism without moving the extension plate 441 and center cam 455 inwardly. Inward movement of control slide 501 moves leg 561 and its roller 563 (FIG. 3) inwardly against channel member 565 pivoting switch actuator bar 567 about pivot *"p"* (FIG. 3).

The switch actuator bar 567 will engage either plunger 623 (FIG. 2) of the microswitch 617 on the right, plunger 623 of the microswitch 617 on the left, or both plungers 623 simultaneously depending on the location of the control slide 501. Movement of plungers 623 will close the corresponding set of switch contacts MS1, MS2 (FIG. 10), or both, to energize both solenoids S1, S2. The plungers 585 (FIG. 2) of solenoids S1, S2 are drawn in when the solenoids are energized pivoting the switch actuator bar 567 through side arms 581 until no further inward movement of the switch actuator bar 567 is possible. This pivoting action will fully seat locator 471 in its locator roller 473 preventing any movement of control slide 501 from side to side. The co-action between the roller 563 and pivoted channel member 565 will prevent any withdrawal of control slides 501. In this manner the control slide 501 is locked until the cycle of operation has been completed.

The closing of either set of switch contacts MS1, MS2 (FIG. 10) will complete a circuit from the positive (+) side of the rectifier R1 through the normally closed contacts C2 of switch 154, either set of contacts MS1, MS2 (now closed), the unidirectional device U1 and the negative (−) side of rectifier R1, to energize control relay CR. Energization of control relay CR closes the contacts CR1 of the control relay CR to complete the circuit for motor 147. Completion of the motor circuit initiates the cycle of operation of the selection mechanism 34.

Rotation of motor 147 drives the motor drive shaft 146, coupling 143, right stud shaft 131, gears 133 and 111, main shaft 101, gears 111 and 117, and left stub shaft 115. Rotation of main shaft 101 drives carriage cams 351. Rotation of right stub shaft 131 drives right side cam 171. Rotation of left stub shaft 115 drives left side cam 161.

Referring now to FIG. 11, which graphically represents the dwell displacement relationship of the cams, during the first portion of the cycle ($t_0$ to $t_1$) carriage cam 351 will pass through a dwell while the side cams 161, 171 will engage rollers 181 and move stop plates 193 towards each other (FIG. 2). Movement of stop plates 193 towards each other moves pivoting rollers 219, arms 215 and frames 25 carried thereby to a closed position (broken lines FIG. 5). During this time ($t_0$–$t_1$) the pivot rollers 219 engage the front edge 73 of movable cover 657 and move movable cover 657 towards front wall 29 and against the bias of springs 671.

As the cycle continues (cycle time $t_1$–$t_2$) the side cams 161, 171 pass through a dwell. Carriage cams 351 move rollers 363 (FIG. 3) and pivot arms 365 about pivot studs 367. The pivoting arms 365 move rollers 371 and thereby displace the guide channels 375, carriage support 383, traveling carriage 401 and center cam 455 towards frames 25 (FIG. 2).

As the center cam 455 enters between and begins to separate the selected frames 25 (cycle time $t_2$ to $t_3$) the radial distance between the cam surface of side cams 161, 171 and the axis of rotation thereof decreases. The action of center cam 455 on pivoting rollers 219 begins to move the frames 25 back to open position. The pivoting rollers 219 engage and move the stop plates 193 away from each other. Cam followers 181 will follow the contour of their respective side cams 161, 171. The pivoting rollers 219, arms 215 and frames 25 carried thereby are in a sense sandwiched between the widening surface of center cam 455 and the separating stop plates 193. The position of stop plate 193 being determined by the surface of side cams 161, 171. When the frames 25 have been slightly opened the springs 671 will also assist the movement thereof to open position by biasing the front edge 673 against the pivoting rollers 219. After the frames 25 have been opened (cycle time $t_3$) the carriage cams 351 allow springs 385 to return the carriage support 383, guide channels 375, rollers 371 and arms 365 to the position shown in FIG. 3.

At cycle time $t_4$ the follower roller 157 of spring arm 156 of switch 154 moves into recess 159 of switch cam 158 and thereby actuates the contacts C1, C2 of switch 154. Contacts C1 of switch 154 will make before contacts C2 of switch 154 break to maintain control relay CR energized, contacts CR1 of control relay CR closed, and motor 147 operating. When contacts C2 open, the circuit to solenoids S1, S2 will be broken to deenergize the solenoids S1, S2. Unidirectional device U1 prevents the current flowing through contacts C1 from reenergizing the solenoids S1, S2. When the solenoids S1, S2 are deenergized, springs 601 carried by solenoid plungers 585 rock switch actuator bar 567 (FIG. 3) clockwise about pivot "*p*" and force stop pad 603 against adjustable stops 605. This action releases the control slide 501 for movement to another selected position.

When the roller 157 of spring arm 156 of switch 154 moves out of recess 159 of switch cam 158 contacts C2 of switch 154 again close and contacts C1 will again open. Contacts MS1, MS2 of switches 617 have been opened by the counterclockwise (FIG. 2) pivoting action of switch actuator bar 567 under action of spring 601. With contacts C1, MS1 and MS2 open, the circuit to control relay CR is broken and contacts CR1 separate. Separation of contacts CR1 of control relay CR deenergizes the motor 147 allowing the internal brake of motor 147 to stop rotation of motor 147, shaft 146, coupling 143, right stub shaft 131, gears 133 and 111, main shaft 101, gears 111 and 117 and left stub shaft 155. The cycle is complete (cycle time $t_e$).

When access to the inside of enclosure 28 is required, the lock 41 is operated and the transparent closure 27 removed from aperture 33 in front wall 29 of enclosure 28. Movement of transparent closure 27 moves arm 699 (FIG. 9) attached thereto releasing plunger 697 of safety switch 691 opening contacts PS thereof. The motor circuit is now open and the machine cannot be cycled.

It is understood that although I have shown the preferred form of my invention, that various modifications may be in the details thereof without departing from its spirit as comprehended by the following claims:

What is claimed is:

1. A remote controlled power operated selection mechanism coacting with a plurality of elements arranged in a series to selectively set any element or adjacent elements of the series into a set position wherein the surface of said element or the surfaces of said adjacent elements may be observed, comprising (a) base means for supporting the power operated selection mechanism, (b) a plurality of carrying members pivotally mounted on said base means, each said carrying member being adapted to support an element of the series of elements, (c) biasing means movably carried by said base means and resiliently urging said carrying members to the set position where the surface of the selected element or the surfaces of the selected adjacent elements may be observed, (d) positioning means mounted on said base means for coaction with said carrying members to change the setting thereof, (e) power means mounted on said base means, (f) connection means mounted on said base means interconnecting said power means and said positioning means, and (g) selection means carried by said base selectively coacting with said positioning means and said power means to effect operation of said positioning means by said power means through said connection means to overcome the urging of said biasing means and change the setting of said carrying members and elements carried thereby according to the selection made.

2. The selection mechanism of claim 1, wherein said positioning means includes, (a) unsetting means carried by the base means and operable by the power means through the connection means to move the carrying members from the set position to an unset position, and (b) setting means carried by the base means and operable by the power means through the connection means to move the carrying members from said unset position to said set position, (c) said setting means being operative only after said unsetting means has completely unset the carrying members.

3. The selection mechanism of claim 2 wherein (a) said unsetting means comprises cam and cam follower assemblies coacting with the carrying members supporting the elements at the extreme ends of the linear series of elements, (b) said setting means comprises cam and cam follower assemblies coacting with the carrying members supporting the elements whose surfaces are to be observed, (c) said unsetting cam and cam follower assemblies and said setting cam and cam follower assemblies being interconnected for operation by said power means through said connection means to operate through a cycle of operation wherein said unsetting cam and cam follower assemblies move said carrying members to said unset position and then said setting cam and cam follower assemblies move said carrying members to said set position, said unsetting cam and cam follower assemblies coacting with said carrying members during movement thereof to said set position to guide said carrying members to said set position.

4. The selection mechanism of claim 1 wherein said selection means includes, (a) a control member selectively settable to any of plural settings corresponding to the location of the surface or surfaces of the element or elements to be observed, (b) cycle initiating means carried by said base means and energized by the setting of said control member to initiate operation of said power means, (c) cycle arresting means interconnected to said power means to arrest operation of said power means after a predetermined interval of time, and (d) interlock means carried by said base means operative upon cycle initiation to prevent any setting of said control member, said interlock means releasing said control member upon operation of said cycle arresting means.

5. The selection mechanism of claim 4 wherein said selection control member includes, (a) a control slide selectively movable in a first direction to any of said plural settings, (b) said control slide when at a selected one of said plural settings being movable in a second direction to initiate operation of said cycle initiating means.

6. A remote controlled power operated selection mechanism coacting with a plurality of elements arranged in a linear series to selectively set any element or any adjacent elements of said series of elements into a set position wherein the surface of said element or the surfaces of said adjacent elements may be observed, comprising (a) base means for supporting the power operated selection mechanism, (b) arm assemblies pivotally carried on said base means, each of said arm assemblies being adapted to pivotally support a first end of an element of the series of elements, (c) pivot means carried by said base means, said pivot means being adapted to pivotally support a second end of an element of the series of elements, (d) said arm assemblies and pivot means cooperating to pivotally support the elements of the series of elements, for movement from the set position to an unset position, said elements when in said unset position being disposed perpendicular to a reference line, (e) an electric motor mounted on said base means, (f) drive means carried by said base means and interconnected to said electric motor to be driven thereby, (g) moving means carried by said base means in engagement with the arm assemblies which support the elements at each end of the series of elements, (h) cam follower means mounted on said moving means, (i) first cam means rotatively driven by said drive means, said first cam means having a cam surface in engagement with said cam follower means carried by said moving means, (j) indicia bearing means mounted on said base means having positional indicia thereon corresponding to the position of the surfaces of the elements in the series of elements, (k) a control slide mounted on said base means for selective movement in directions parallel to said reference line and said indicia bearing means, said control slide including a pointer adapted for alignment with the indicia on said indicia bearing means, (l) second cam means mounted on said base means for movement in directions parallel to said reference line, and in directions perpendicular to said reference lines, said second cam means being interconnected to said control slide to be moved by said control slide only during movement of said control slide in directions parallel to said reference line, (m) second cam operating means mounted on said base means and driven by said drive means, said second cam operating means when driven by said drive means moving said second cam in directions perpendicular to the reference line, (n) said control slide also being movable in directions perpendicular to said reference line, from an unactuated position to an actuated position, (o) biasing means urging said control slide to its unactuated position, (p) a switch bar pivotally mounted on said base means, said control slide during movement to said actuated position pivoting said switch bar, (q) switch means having normally open contacts therein mounted on said base means in engagement with said switch bar whereupon pivoting movement of said switch bar by said control slide the normally open contacts of said switch means are closed, (r) electrically actuated interlock means operative upon closing of said normally open contacts to lock said control slide in actuated position against the urging of said biasing means, (s) cycle control means electrically interconnected to said normally open contacts of said switch means and said electrical motor means, said cycle means upon closing of said normally open contacts of said switch means actuating said electric motor to initiate a cycle of operation of said drive means, (t) said drive means during said cycle of operation driving said first cam means and said second cam operating means, said first cam means during a first time interval of said cycle of operation moving said cam follower means and thereby said moving means to move said arm assemblies and elements supported thereby from set to unset position, said second cam operating means during a second time interval of said cycle of operation moving said second cam in a direction perpendicular to said reference line, said first cam means, cam follower means, moving means, second cam operating means and second cam means during a third time interval of said cycle of operation coacting to move said arm assemblies and elements carried thereby from unset to set position, (u) cycle termination means operative by said drive means after a predetermined interval of time at least equal to the sum of said first, said second and said third time intervals, to return said closed contacts of said switch to their normally open condition, releasing said interlock and deactuating said cycle control and said electric motor to terminate operation of said drive means, and (v) element biasing means adapted to releasably maintain the elements of said series of elements in set position, said moving means during movement thereof to move the arm assemblies and elements supported thereon to unset position overcoming the effect of said element biasing means, said element biasing means assisting movement of the elements of said series of elements to set position, 7. A storage unit comprising (a) support means, (b) a plurality of storage members each carried by said support means for pivotal movement about a pivotal axis of rotation, (c) said plurality of storage members being arranged on said support means in juxtaposition, similar to the positioning of pages of a book, (d) separating means carried by said support means and being operable to separate said storage members between any two adjacent ones thereof, said storage members upon operation of said separating means being pivotally separated to positions similar to the pages of an open book, (e) keeper means carried by said support means for coaction with said plurality of storage members to maintain said storage members in separated open book like positions, (f) power means carried by said support means, (g) connecting means interconnecting said separating means to said power means, and (h) selecting means carried by said support means for selecting which adjacent storage members should be separated by said separating means, said selecting means upon operation thereof energizing said power means to drive said separating means through said connecting means, said separating means during operation thereof overcoming the effect of said keeper means.

8. A visible records unit, comprising (a) plural walls defining an enclosure, one of said walls having an opening therein, through which the inside of said enclosure may be viewed, (b) a plurality of juxtapositioned frames pivotally mounted in said enclosure and observable through said opening, each of said frames having a front and rear surface, the rear surface of one of said frames being pivotable to a position adjacent the front surface of the next adjacent frame, (c) each of said frames being pivotable about an axes of rotation, all the axes of rotation lying in a common reference plane, (d) visible data bearing elements mounted on the front and the rear surfaces of each of said frames, (e) said frames being selectively pivotable to a first reading position wherein all the front surfaces lie at an acute angle to the reference plane, the rear surfaces of a first one of said frames assuming a position with the data thereon viewable through the opening.

(f) said frames being selectively pivotable to a second reading position wherein all the rear surfaces lie at an acute angle to the reference plane, the front surface of a second one of said frames assuming a position with the data thereon viewable through the opening, (g) said frames being selectively pivotable to a plurality of other reading positions wherein two adjacent frames have been separated and the plurality of frames divided into a first group and a second group, the front surface of all the frames in the first group lying at an acute angle to the reference plane, the rear surfaces of all the frames in the second group lying at an acute angle to the reference plane, the rear surface and front surface respectively of the separated frames assuming a position with the data thereon viewable through said opening, (h) biasing means mounted in said enclosure for coaction with said frames to yieldably maintain said frames in reading position, (i) frame pivoting means mounted in said enclosure for selective coaction with said frames, (j) power means mounted in said enclosure, (k) interconnecting means mounted in said enclosure interconnecting said power means to said frame pivoting means, and (l) selecting means mounted in said enclosure operable to actuate said frame pivoting means to selectively pivot said frames to any of their respective reading positions, said separating means being driven by said power means through said interconnecting means, said separating means during operation thereof overcoming the affect of the biasing means.

9. The visible records unit of claim 8, wherein said frame pivoting means, comprises (a) frame closing means mounted in the enclosure to move the frames from their reading position to a closed position wherein the front and rear surfaces of the frames are at a right angle to the reference plane, and (b) frame opening means mounted in said enclosure to selectively reopen the closed frames and move the frames to their reading position.

10. An information storage and retrieval unit, comprising (a) an enclosure having front, rear and side walls, said front wall having an opening therein to provide access to the interior of said enclosure, (b) base means disposed within said enclosure with a small angular tilt towards the rear wall of said enclosure, (c) a plurality of pivoting members each having a front leg, a rear leg and an arm interconncting said front leg and rear leg, each of said plurality of pivoting members being mounted upon said base means for pivoting movement about a pivot axis through its rear leg, (d) a plurality of pivot members mounted in said enclosure, each pivot member being in alignment with but spaced from a rear leg of one of said plurality of pivoting members, (e) a plurality of substantially rectangular frames, each frame being supported between a pivot member and a pivoting member for pivoting movement about a pivot axis inclined to the vertical at an angle equal in degrees to the angular tilt of the base means, said frames each having a front and rear surface adapted to have visual information displayed thereon, said frames occupying either a closed position in which the front and rear surfaces of said frames are substantially parallel to the sidewalls of said enclosure, or an open position in which the front and rear surfaces of said frames are disposed at an angle to the sidewalls of said enclosure, a selected front surface, a selected rear surface or selected adjacent or front and rear surfaces of said frames being viewable through said opening in said enclosure when said frames are in their open position, (f) biasing means in said enclosure urging said frames to their open position, (g) carriage support means mounted on said base means for movement in directions parallel to the sidewalls of said enclosure,
(h) carriage means supported on said carriage support means for movement in directions parallel to said front and rear walls of said enclosure,
(i) carriage moving means carried by said base means for moving said carriage support and carriage in directions parallel to the sidewalls of said enclosure from a rest position to an advanced position and back to rest position,
(j) a frame opening cam carried by said carriage means for movement therewith,
(k) a control slide mounted on said base means for movement in directions parallel to the front wall of said enclosure and within the opening therein, said control slide having formed therewith a position indicator and a handle portion extending outside said enclosure,
(l) control slide and carriage interconnecting means interconnecting said carriage and control slide for conjoint movement in directions parallel to the front wall of said enclosure, said interconnecting means allowing said control slide and carriage to move relative to each other in directions parallel to the sidewalls of said enclosure,
(m) indicia bearing means mounted in said enclosure, having makings thereon indicative of the location of the surfaces of said frames, said indicia bearing means being positioned in proximity to the indicator on said control slide,
(n) frame closing means coacting with the front legs of the pivoting members to move said pivoting members from a position wherein the frames carried thereby are in said open position to a position wherein the frames carried thereby are in said closed position,
(o) an electric motor mounted on said base means,
(p) drive means interconnecting said electric motor, carriage moving means, and frame closing means for timed movement through a cycle of operation,
(q) cycle initiating means responsive to movement of said control slide in a direction parallel to the sidewalls of said enclosure, for energizing said motor to operate said drive means,
(r) said control slide when moved in directions parallel to the front wall of said enclosure moving said carriage and frame opening cam, said indicator on said control slide coacting with said indicia bearing means to indicate the position of said control slide and the corresponding surfaces of said frames,
(s) said control slide when moved in a direction parallel to the sidewalls of said enclosure actuating said cycle initiating means to energize said electric motor and operate said drive means,
(t) said drive means first operating said frame closing means to move said frames from their open position to their closed position, said frame closing means overcoming the effect of said biasing means when moving said frames from their open to their closed position,
(u) said drive means upon said frames reaching said closed position, operating said carriage moving means to move said carriage means and frame opening cam carried thereby in a direction parallel to the sidewalls of said enclosure, said frame opening cam entering between the front legs of two adjacent pivoting means to pivot said pivoting means and frames in opposite directions about said pivot axis, said frame closing means being driven by said drive means so as to guide said pivoting means during movement from closed to open position, and
(v) cycle termination means operative after said frames have been closed and then reopened to terminate operation of said electric motor and said drive means.

11. The information storage and retrieval unit of claim 10, wherein said biasing means includes
(a) a cover carried by said base means for movement in directions parallel to the sidewalls of said enclosure,
(b) said cover having an edge contacting the front legs of the pivoting means, and
(c) spring means urging said edge of said cover against said front legs of said pivoting means,

12. The information storage and retrieval unit of claim 11, including
(a) control slide locator and interlock means operative upon cycle initiation to lock said control slide against any movement,
(b) said cycle termination means releasing said interlock upon operation thereof.

13. The information storage and retrieval system of claim 12 wherein said control slide locator and interlock means includes,
(a) an interlock member mounted on said base means for pivoting movement in directions parallel to the sidewalls of said enclosure,
(b) interlock spring means urging said interlock member towards the front wall of said enclosure,
(c) lock means responsive to operation of said cycle initiating means for coacting with said interlock member to overcome the effect of said interlock spring means and draw said interlock member and control slide towards the rear wall of said enclosure,
(d) a locking arm interconnecting said control slide and interlock member,
(e) a locator arm carried by said control slide,
(f) locator means carried by said base means, said locator means and said locator arm coacting to center said frame opening cam midway between two adjacent pivoting means when said pivoting means and frame carried thereby are in their closed position,
(g) said lock means upon actuation of said cycle initiating means drawing said interlock member and control slide towards the rear wall of said enclosure thereby locking said control slide against any movement in directions parallel to the sidewalls of said enclosure, said locator arm on said control slide and said locator means coacting to prevent any movement of said control slide in directions parallel to the front wall of said enclosure,
(h) said lock means upon operation of the cycle termination means releasing said interlock member and allowing the interlock spring to move the interlock member towards the front wall of the enclosure disassociating said locator arm and locator means.

14. In equipment of the class described for obtaining access to the sides of a plurality of two sided elements arranged in a compact grouping in which neither side normally is accessible, comprising
(a) a carrying member for supporting each two-sided element,
(b) support means mounting said carrying members to provide for swinging movement of said carrying members and thereby said elements,
(c) separating means operable upon a selected pair of said carrying members to effect swinging thereof in opposite directions about substantially a common pivot point to present an angular arrangement of the selected pair of elements with respect to each other, whereby adjacent sides of said pair of elements are rendered accessible,
(d) motor operated drive means for providing relative movement between said carrying members and said separating means to effect separation of the selected pair of carrying members,
(e) selection means for initiating operation of said motor operated drive means for selecting the desired pair of elements to be swung into said angular arrangement, (f) drive initiating means actuated by said selection means to initiate operation of said motor operated drive means, (g) interlock means coacting with said selection means and responsive to said drive initiating means to lock said selection means in selected operative position, and (h) drive termination means operable by said motor operated drive means after a first predetermined interval of time to release said interlock means and thereby said selection means, said drive termination means after a second predetermined interval of time terminating the operation of said motor operated drive means.

References Cited by the Examiner

UNITED STATES PATENTS

| | | | |
|---|---|---|---|
| 1,313,150 | 8/19 | Wood | 312—191 |
| 2,292,525 | 8/42 | Ketterman | 312—19 |
| 2,621,995 | 12/52 | Zenner | 312—223 |
| 2,758,901 | 8/56 | Cole | 312—223 |
| 2,883,250 | 4/59 | Tod | 312—193 |

FRANK B. SHERRY, *Primary Examiner.*

CHANCELLOR E. HARRIS, *Examiner.*